United States Patent [19]

Fischer

[11] 4,434,597
[45] Mar. 6, 1984

[54] FASTENING DEVICE

[76] Inventor: Artur Fischer, Weinhalde 34, D-7244 Waldachtal 3/Tumlingen, Fed. Rep. of Germany

[21] Appl. No.: 313,754

[22] Filed: Oct. 22, 1981

[30] Foreign Application Priority Data

Nov. 5, 1980 [DE] Fed. Rep. of Germany ....... 3041697

[51] Int. Cl.³ .............................................. E05C 5/20
[52] U.S. Cl. ........................................ 52/681; 52/677; 52/127.5; 52/127.7; 52/127.11
[58] Field of Search ................. 52/681, 677, 678, 679, 52/680, 681, 682, 683, 684, 127.5, 127.7, 127.9, 127.11

[56] References Cited

U.S. PATENT DOCUMENTS

| | | | |
|---|---|---|---|
| 1,624,193 | 4/1927 | Voight | 52/681 |
| 1,711,928 | 5/1929 | Doucett et al. | 52/681 |
| 2,711,097 | 6/1955 | Miller | 52/678 |
| 4,065,890 | 1/1978 | Fenner | 52/127.11 X |

*Primary Examiner*—John E. Murtagh
*Assistant Examiner*—Richard E. Chilcot, Jr.
*Attorney, Agent, or Firm*—Michael J. Striker

[57] ABSTRACT

The fastening device of the present invention is designed as a dowel which can be anchored in brickwork by a screw, a nail or similar anchoring means. The dowel has a tubular body extending from the brickwork at one end and is provided with a holding device at the other end. The holding device then supports a wire grating at a fixed distance from the brickwork surface. The wire grating acting as a means for support for the plaster applied to it.

6 Claims, 2 Drawing Figures

FASTENING DEVICE

FIELD OF THE INVENTION

This invention relates in general to a fastening device and specifically to a fastening device for supporting and locating wire lath.

PRIOR ART AND BACKGROUND

When brickwork is to be covered by heat insulating boards the surface of the heat insulating board is generally plastered. In preparation for the plastering a wire grating mat is fixed a certain distance from the insulating board surface and plaster is applied to the wire grating. The wire grating then has to be fixed in such a way that it is able to carry the weight of the plaster together with the wind load and suction stresses acting on the plaster layer.

One of the existing prior art methods for attaching building components is the use of expanding dowels. Expanding dowels will provide the necessary spacing for the building components by having projections on the dowel circumference which elastically deform in order to retain the wire grating. This spacing method has the advantage of simple attachment to the support structure of the building since the dowel is inserted into a predrilled hole. However the elastic projections are not able to receive high compressive stresses and therefore are subject to bending or breaking off. When the dowels bend or break off the wire grating is not properly supported. Other types of rigid support means are known such as concrete nails. The other support means cannot be installed by the insertion method and therefore are more difficult to install as well as require more time for installation.

SUMMARY OF THE INVENTION

The present invention is designed to provide a fastening device for attaching wire grating a fixed distance from a support surface and can be installed from the front side of the support surface. Installation from the front side eliminates the need to get to the back side of the support surface and therefore simplifies installation. The fastening device has a holding device which can be made to engage the wire grating after the grating is in position. The holding device of the present invention is able to sustain high compressive and suction stresses.

An object of the present invention is to provide for attaching a wire grating a fixed distance from a support surface.

Another object of the present invention is to enable the wire grating to be locked into position after placement of the wire grating on the fastening device.

BRIEF DESCRIPTION OF THE DRAWINGS

The present disclosure will be better understood when the drawings below are taken together with a description of the preferred embodiment.

DESCRIPTION OF THE PREFERRED EMBODIMENT

Figure 1:
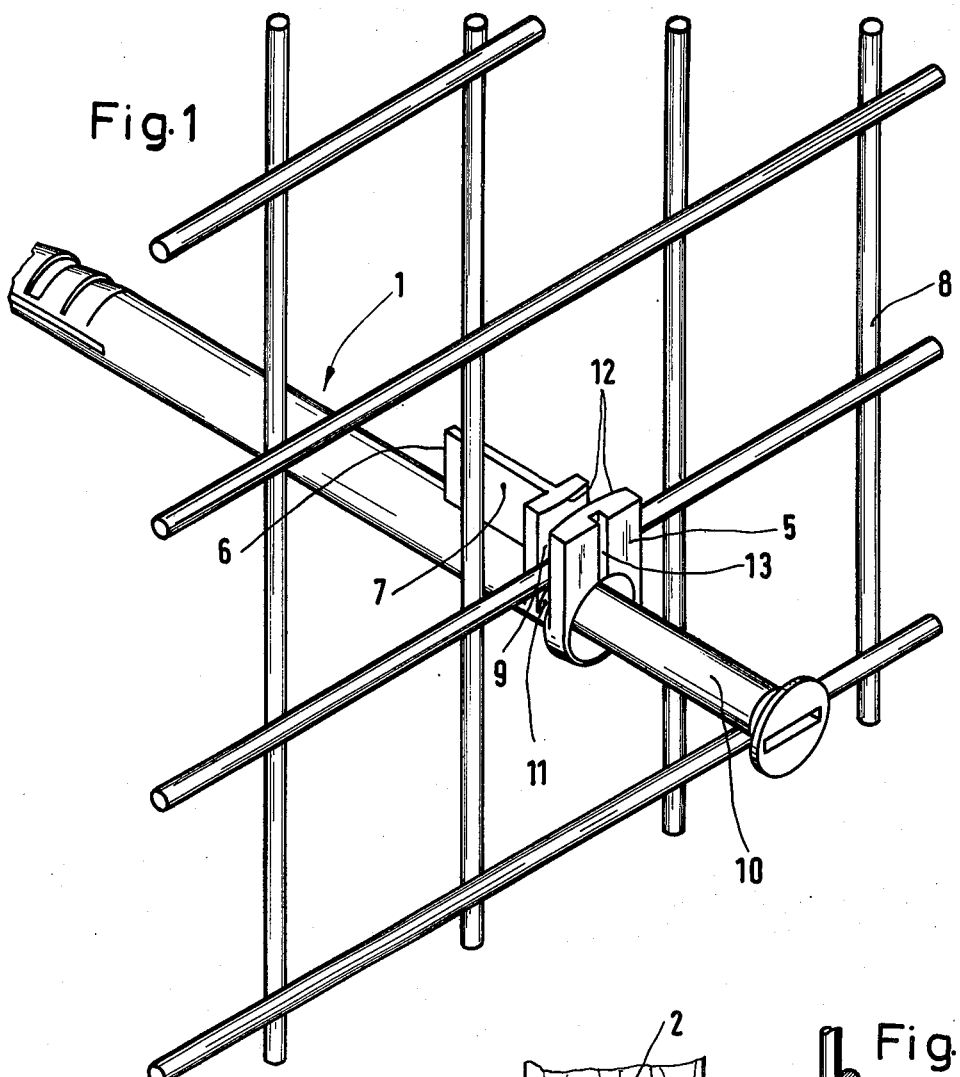
FIG. 1. shows the present invention supporting the wire grating.

FIG. 1. shows the fastening device of the present invention supporting a wire grating 8. The fastening device is comprised of a dowel 1 having a cam 5 integrally attached as shown. When cam 5 is in the vertical position shown it engages one of the horizontal wires of the wire grating 8 in a slot 9. Cam 5 is comprised of the two portions shown in FIG. 1. The cam 5 second portion in front of the wire grating 8 is wider than the cam 5 first portion behind the wire grating 8. A pair of surfaces 12 each have a convex surface which enables the cam 5 to contact the horizontal wire at a single point. A bottom 11 of the slot 9 formed by the two portions of the cam 5 is also of convex shape. The top of the convex surface of the bottom 11 being in alignment with the dowel 1 circumference.

Integral with the rear portion of a cam 5 is a web 7 extending away from the cam 5. The web 7 has a front end 6 which is used as a stop thereby limiting the longitudinal axial movement of the dowel 1. A screw 10 passes through the longitudinal axis of dowel 1 and serves to anchor the dowel 1 when the screw 10 is fully driven into dowel 1. After placement of the wire grating 8 onto dowel 1, a slot 13 in the front portion of the cam 5 facilitates turning of the dowel 1 so that the slot 9 can engage the horizontal wire.

Figure 2:
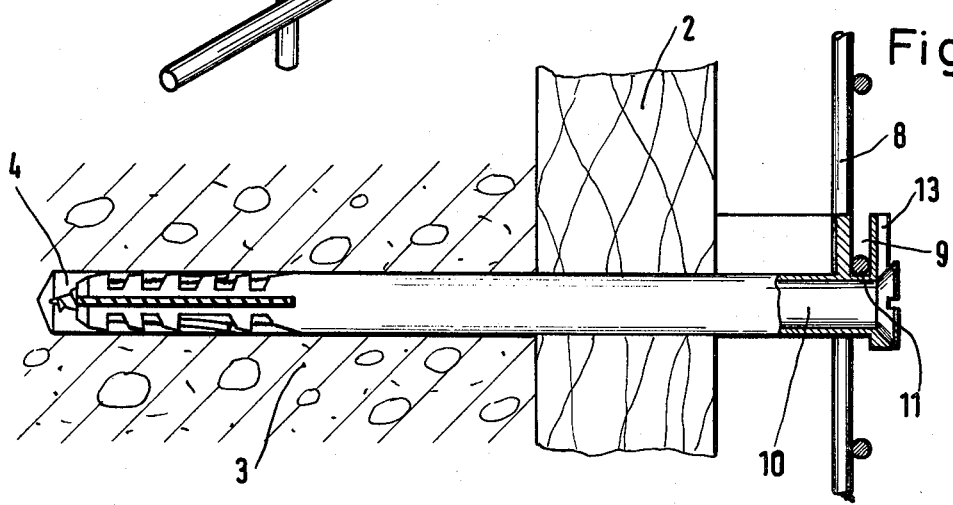
FIG. 2. shows the application of the present invention to a brickwork surface having heat-insulating boards affixed thereto.

FIG. 2 illustrates application of the fastening device of the present invention to a brickwork face 3 having a heat insulator board 2 attached to its front surface. A hole 4 drilled into the brickwork 3 and insulator board 2 receives the dowel 1. The front end 6 of the web 7 is shown abutting against the front surface of the heat insulating board 2. Web 7 serves to set the desired distance for spacing between the grating 8 and the brickwork 3. Partial sectioning of the dowel 1 serves to better illustrate the positioning of the horizontal wire in the slot 9. The horizontal wire is shown in contact with the top of the convex surface of bottom 11. Slot 13 which is used for positioning the cam 5 by means of a driving tool is also shown.

Operation of the fastening device will be better understood as its application is described. Placement of the wire grating 8 will be facilitated if a first upper row of holes are drilled and for each hole to receive a fastening device of the present invention. The dowel 1 is inserted into each hole 4 and anchored by screw means 10.

FIG. 2 illustrates an anchoring means for the dowel 1 which employs an expansion portion in the hole 4 which is caused to contact the walls of hole 4 as the screw 10 is driven in. The method of anchoring dowel 1 should not be considered as limited to the illustration shown in FIG. 2 but may encompass any of the other workable means found in the construction field. Web 7 is used to set the spacing before anchoring of each dowel. The upper row of dowel 1 is arranged so that slots 9 are all directed upward and a top horizontal wire is placed in the slots for support of the wire grating 8. After the wire grating 8 is suspended, holes 4 for fastening other portions of the wire grating 8, are drilled. The holes 4 are drilled by positioning the drill midway between two vertical wires and against the lower edge of the horizontal wire. After the hole 4 is drilled a dowel 1 with the cam 5 in horizontal position is inserted. When the slot 9 is positioned below the horizontal wire the dowel may be turned 90° by inserting a tool such as a screwdriver into the slot 13. The turning of dowel 1 by 90° causes the slot 9 to capture the horizontal wire. The driving in of screw 10 anchors the dowel 1 and thereby prevents axial movement of the horizontal wire. Dowel 1 may be anchored by a nail or other suitable means. Further, the spacing of the wire grating 8 from the brickwork 3 can be changed during installation by shifting the dowel 1 in the hole 4 before anchoring.

The convex surfaces of the cam 5 result in a point or line contact with the horizontal wire and therefore reduces friction enabling easy cam 6 movement. The convex surfaces of the slot 5 facilitates movement of cam 6 in cases when the drilled hole is not exactly perpendicular to the brickwork 3 face. Although the screw 10 and cams are shown with slots for specific driving tools an integral hexagon or the like may be used. The web 7 is used to fix the spacing between wire grating 8 and insulating board 2. Although web 7 allows a rapid and easy setting of the spacing, the spacing may be altered if necessary since the web may be pressed into the heat-insulating board 2.

While the invention has been described with respect to a single embodiment it will be understood that variations and modifications may be made without departing from the spirit or scope of the invention.

What is claimed is:

1. A fastening device for use with brickwork comprising: a dowel having a dowel front end, a prolonged neck which projects from said brickwork and anchoring means for fastening said dowel to said brickwork; a holding device arranged at said dowel front end for fastening a wire grating serving as a base for plastering, said holding device being a radially projecting cam having a slot at right angle to the longitudinal dowel axis and said slot opening corresponding to the wire thickness of said wire grating wherein said slot is comprised of a pair of surfaces, at right angle to the longitudinal dowel axis, each having a convex shape.

2. A fastening device for use with the brickwork comprising: a dowel having a dowel front end, a prolonged neck which projects from said brickwork and anchoring means for fastening said dowel to said brickwork; a holding device arranged at said dowel front end for fastening a wire grating serving as a base for plastering, said holding device being a radially projecting cam having a slot at right angle to the longitudinal dowel axis and said slot opening corresponding to the wire thickness of said wire grating wherein said slot consists of a bottom, at right angle to the longitudinal dowel axis having a convex surface which is in alignment with said dowel circumference.

3. The device described in claim 2 wherein, said cam is comprised of a first portion nearest said brickwork having a maximum width equal to said dowel diameter and a second portion remote from said brickwork having a width greater than said dowel diameter.

4. The device described in claim 2 wherein, said dowel front end is provided with a slot for receiving a driving tool.

5. The device described in claim 2 wherein, said dowel front end is provided with an internal hexagon for receiving a driving tool.

6. The device described in claim 2 wherein, said dowel is comprised of a web integral with said dowel attached to said cam, extending away from said cam in a longitudinal dowel direction and having a front end whereby said front end acts as a stop to limit insertion of said dowel.

* * * * *